US007079633B2

(12) United States Patent
Iliev et al.

(10) Patent No.: US 7,079,633 B2
(45) Date of Patent: Jul. 18, 2006

(54) CODING A MASKED DATA CHANNEL IN A RADIO SIGNAL

(75) Inventors: Alexander Iliev, Miami, FL (US); Michael Scordilis, Miami, FL (US); Howard Leventhal, 2885 Farmington Dr., Lindenhurst, IL (US) 60046

(73) Assignee: Howard Leventhal, Lindenhurst, IL (US)

( * ) Notice: Subject to any disclaimer, the term of this patent is extended or adjusted under 35 U.S.C. 154(b) by 717 days.

(21) Appl. No.: 10/341,626

(22) Filed: Jan. 14, 2003

(65) Prior Publication Data

US 2003/0219036 A1 Nov. 27, 2003

Related U.S. Application Data

(60) Provisional application No. 60/348,132, filed on Jan. 15, 2002.

(51) Int. Cl.
*H04M 11/00* (2006.01)

(52) U.S. Cl. .................................. 379/100.13; 370/480

(58) Field of Classification Search ................ 370/203, 370/480; 379/88.14, 93.15, 100.13
See application file for complete search history.

(56) References Cited

U.S. PATENT DOCUMENTS 6,614,914 B1 * 9/2003 Rhoads et al. .............. 382/100
6,763,123 B1 * 7/2004 Reed et al. ................. 382/100

* cited by examiner

*Primary Examiner*—Bing Q. Bui
(74) *Attorney, Agent, or Firm*—Christopher & Weisberg, P.A.

(57) ABSTRACT

A system for supplementing an audio signal with auxiliary data in an inaudible channel. The system can include an audible radio signal source having at least a left channel and a right channel. A digital signal processor can be programmed to transform the audible radio signal source into a frequency domain representation having multiple frequency component portions of the audible radio signal. A comparator can be coupled to the digital signal processor and can have an established imperceptible IPD. The comparator can identify selected ones of the frequency component portions having corresponding phase values which do not exceed the imperceptible IPD. Finally, an encoder can be configured to encode a digital auxiliary data signal into the audible radio signal by modifying the corresponding phase values to correspond to individual bit values of the digital auxiliary data.

20 Claims, 7 Drawing Sheets

CODING A MASKED DATA CHANNEL IN A RADIO SIGNAL

CROSS-REFERENCE TO RELATED APPLICATIONS

This patent application claims priority under 35 U.S.C. §119(e) to U.S. patent application Ser. No. 60/348,132, filed on Jan. 15, 2002, the contents of which are incorporated herein by reference.

BACKGROUND OF THE INVENTION

1. Statement of the Technical Field

The present invention relates to the transmission of encoded data in a radio signal, and more particularly to audio watermarking.

2. Description of the Related Art

The conventional radio frequency spectrum ranges from 30 kHz to 300 GHz and consists of very low frequency (VLF), low frequency (LF), medium frequency (MF), high frequency (HF), very high frequency (VHF), ultra high frequency (UHF), SHF and EHF allocations for both civil and military applications. Though it cannot be said that the modern allocation of the conventional radio frequency spectrum had ever represented an adequate distribution of bandwidth able to satisfy the needs of all users, until recently, the modern allocation of the conventional radio frequency spectrum had served its purpose nonetheless. More recently, however, advancements in communications technologies have rendered the modern allocation unacceptable.

Specifically, there recently has arisen an acute need for accommodating a greater throughput of information within the presently limited allocation of radio spectrum available to both military and civilian users. In that regard, as advanced communications are developed for use within their respective presently allocated portion of the radio spectrum, a greater amount of information must flow within the allocated portion, even though the allocated portion is bandwidth limited. Thus, in the formation of an advanced communications system, incremental radio frequency spectrum slices will be required to accommodate the implementation of the system.

Yet, short of re-allocating the present bandwidth limited radio frequency spectrum to include a new spectrum slice, most new data transmission systems require dedicated radio spectrum that must be allocated or re-assigned from preexisting concerns. Few who presently control a portion of the required spectrum, however, would be willing to relinquish control over their respective monetarily invaluable slice of the radio frequency spectrum. Consequently, the implementation of a new radio frequency communications technology will not be possible in many cases.

To address the inherent bandwidth limitations of the radio frequency spectrum several multiplexing techniques have been both proposed and implemented. In particular, within the wireless communications arts, multiplexing has become an essential technology with regard to the expansion of a pre-established and fixed width slice of the radio frequency spectrum. Several types of multiplexing schemes have been successfully deployed to facilitate such expansion, including Time Division Multiple Access (TDMA), Frequency Division Multiple Access (FDMA) and Code Division Multiple Access (CDMA).

In all multiplexing cases, however, the use of multiplexing is hardware and software dependent upon the specific application. To that end, while multiplexing has been proven successful in the expansion of an allocated portion of the radio frequency spectrum to accommodate digital cellular voice and data traffic, the multiplexing solutions of digital cellular telephony are strictly limited to such application. To apply multiplexing to other forms of data exchange would require a ground-up design and implementation of an entirely new communications mechanism.

Notwithstanding, it would be preferable to be able to transmit auxiliary data over an existing communications link residing within an already allocated portion of the radio frequency spectrum. As an example, in the aviation arts "free flight" navigation systems have been proposed in which positional and environmental data regarding the position and placement of an aircraft in three-dimensional space can be collected by the aircraft and provided to remotely positioned entities, such as ground control operators. Importantly, the free flight navigation data can be provided from aircraft to ground without the assistance of radar. Consequently, an approximate if not accurate three-dimensional visualization of the position of the aircraft and its environment can be provided to the remotely positioned entity.

To enable the communication of free flight data from aircraft to remote entity, though, would require a separate communicative link between the aircraft and remote entity. Considering the limited allocation of radio frequency spectrum, however, it would seem that a truly effective free flight navigation system would not be possible without the cooperation of one or more stakeholders of the modern allocation of the radio frequency spectrum. In fact, in the similar circumstance of packet radio and third generation (3G) wireless technologies, the government of the United States indeed relinquished a significant portion of the radio frequency spectrum then allocated for military use. Yet, at present it does not seem realistic to expect the government of the United States to continue to relinquish control over its allocated portion of the radio frequency spectrum to accommodate every emerging technology requiring bandwidth in the radio frequency spectrum.

Analogously, in the technical space of multimedia broadcasting and distribution, advances in technology have led to the development of systems for controlling the distribution and use of multimedia works, such as music, video and the like. These technological advances, however, like free flight navigation, require either a significant increase in radio frequency bandwidth to accommodate additional data used in the course of implementing content distribution control technologies. In particular, content limiting data must be included with the multimedia work upon its distribution, thereby dramatically increasing the size of the deliverable which would then include both the multimedia content itself, in addition to the control data. As before, though, it would not be expected that a controlling entity would relinquish portions of allocated bandwidth in support of the implementation of content distribution technologies.

As a result, while many have abandoned attempts at implementing content distribution control technologies, some notable efforts persist. Examples include multimedia watermarking, and more particularly, audio watermarking. To implement multimedia watermarking over the wireless radio frequency medium, it has been suggested that the watermarking data ought to be broadcast simultaneous with the multimedia payload in a spread spectrum manner. In this regard, by spreading broadcast components of the data across a multiplicity of broadcast frequencies, the ability of one to individually detect a component portion of the transmission would be reduced to a near impossibility. Unfortunately, spread spectrum watermarking techniques limit the volume of control data to a pittance barely adequate to carry basic copyright information.

SUMMARY OF THE INVENTION

The present invention is a data packing technology configured to address the foregoing deficiencies of the modern allocation of the radio frequency spectrum. In particular, the data packing technology of the present invention can provide a novel and non-obvious audio watermarking method, system and apparatus in which an inaudible, masked data channel can be coded within an audible radio signal. Consequently, data which remains only auxiliary to the underlying audio signal can be overlain atop the audio signal so as to not require additional bandwidth to accommodate the auxiliary data. By inserting the auxiliary data within the audio signal, emerging technologies such as free flight navigation systems and digital watermarking can be accommodated within existing bandwidth constraints without requiring a wider communications path or an increased file size.

In a preferred aspect of the present invention, a method for coding auxiliary data in an inaudible channel in an audio signal can include the steps of establishing an upper bound imperceptible interaural phase difference (IPD) between at least two audible channels in the audio signal below which differences in phase between the channels cannot be audibly detected. Frequency component portions of the audio signal can be identified which have a phase difference which does not exceed the established upper bound IPD. Subsequently, phase differences between the identified frequency component portions can be modified to encode digital auxiliary data in the audio signal. As a result, the encoded digital auxiliary data can be decoded by detecting the modified phase differences between the identified frequency component portions of the audio signal.

A system for supplementing an audio signal with auxiliary data in an inaudible channel can include an audible radio signal source having at least a left channel and a right channel. A digital signal processor can be programmed to transform the audible radio signal source into a frequency domain representation having multiple frequency component portions of the audible radio signal. A comparator can be coupled to the digital signal processor and can have an established imperceptible IPD. The comparator can identify selected ones of the frequency component portions having corresponding phase values which do not exceed the imperceptible IPD. Finally, an encoder can be configured to encode a digital auxiliary data signal into the audible radio signal by modifying the corresponding phase values to correspond to individual bit values of the digital auxiliary data.

A decoder can be coupled to the digital signal processor. The decoder can have the established imperceptible IPD. Furthermore, the decoder can be configured to decode the digital auxiliary data in the audible radio signal by detecting the modified corresponding phase values and by translating the modified corresponding phase values into bit values for the digital auxiliary data. Notably, the digital auxiliary data can include positional data produced by a global positioning system. The digital auxiliary data alternatively can include audio watermarking data produced to control use and distribution of the audible radio signal. As yet another alternative, the digital auxiliary data can include audio watermarking data produced to supplement the audible radio signal.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a system, method and apparatus for concealing auxiliary data within an audible signal in the radio frequency spectrum. Specifically, auxiliary data can be reduced to digital form and can be used as a basis for modifying phase differences between channels in an audio signal so as to encode the auxiliary data within the audio signal without consuming additional frequency bandwidth as would be required otherwise in accordance with the prior art. Importantly, the modified phase differences between channels in the audio signal do not import audible modifications to the audio signal itself. In this regard, an audio signal which has not been modified cannot be acoustically distinguished from an audio signal which has been modified to carry the auxiliary data in accordance with the present invention.

Figure 1:
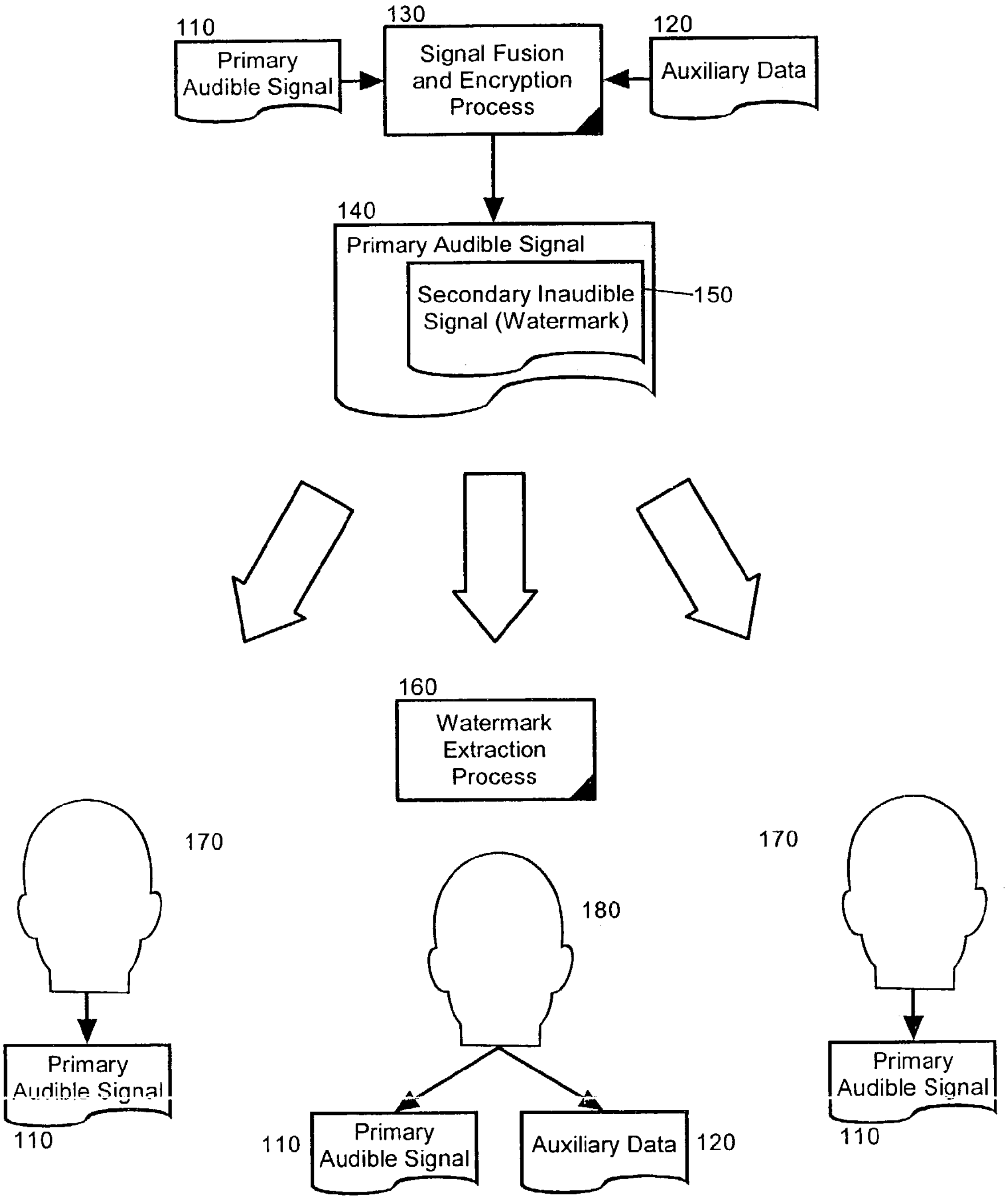
FIG. 1 is a pictorial illustration of a system and process for concealing auxiliary data within an audio radio signal for recognition only by recipients configured to extract the concealed auxiliary data while other recipients can detect only the audible portions of the audio radio signal.

FIG. 1 is a pictorial illustration of a system and process for concealing auxiliary data within an audio radio signal for recognition only by recipients configured to extract the concealed auxiliary data while other recipients can detect only the audible portions of the audio radio signal. In accordance with the inventive arrangements, a primary audible signal 110 can be fused with auxiliary data 120 in a fusion process 130 so as to form a composite signal 140 in which the auxiliary data 120 has been masked by the primary audio signal 110 to produce an audio watermark 150. More particularly, the signal characteristics of the primary audible signal 110 can be modified so as to encode the auxiliary data 120 without requiring expanded bandwidth to carry the primary audio signal 110. Rather, the density of information contained within the primary audio signal 110 can be expanded to include the auxiliary data 120, while the bandwidth of the audio signal 110 can remain the same.

Recipients 170, 180 of the composite signal 140 can detect and decode the primary audible signal 110 without regard to the watermark 150. In particular, the modifications to the signal characteristics of the primary audible signal 110 can be kept below a minimum threshold so that the modified characteristics will remain indistinguishable from an otherwise unmodified signal. Yet, the modifications to the signal characteristics of the primary audible signal 110 can be such that a voluminous quantity of auxiliary data 120 can be encoded within the primary audible signal 110 to produce the watermark. Consequently, not only can auxiliary data 120 be encoded onto the primary audible signal 110, but also the fusion process 130 can encrypt the auxiliary data 120 so as to provide yet a further layer of security in the steganographic transmission of the auxiliary data 120.

In any case, a particular recipient 180 who has been configured with a watermark extraction process 160 can extract the audio watermark 150 from the composite signal 140 simply by decoding the modified signal characteristics of the primary audible signal 110. Once the audio watermark 150 has been decoded, if further decryption will be required in consequence of encryption protections afforded to the auxiliary data 120 during the fusion process 130, the watermark 150 can be decrypted accordingly to produce the auxiliary data 120. Otherwise, the decoded watermark 150 itself can represent the auxiliary data 120.

It will be recognized by one skilled in the art that as an important aspect of the present invention, the audio watermarking process can overcome the substantial limitations of the modern bandwidth limited audio frequency spectrum as, in accordance with the present invention, volumes of auxiliary data can be incorporated in a primary audible signal without requiring increased bandwidth. Rather, the density of information contained within the existing primary audible signal simply can be increased to accommodate the auxiliary data. As a result, advanced technologies which heretofore were inhibited by bandwidth limitations now can become a reality. Examples include economically reasonable free-flight navigation systems, multimedia content distribution controls, and enhancements to multimedia content.

To enable the audio watermarking of a primary audible signal without usurping additional frequency bandwidth, a binaural hearing phase tolerance model (BHPTM) can be applied to the primary audible signal to identify frequency components of a time varying audible signal which can be modified without inducing audibly distinctive characteristics in the audible signal. Specifically, by identifying the minimum audible angle (MAA) specifying the minimum angular detectable angular displacement of a sound source, an interaural phase difference (IPD) can be computed. The IPD can be used to specify a maximum frequency phase difference between channels in a stereo signal below which variations in the phase of two channels of the signal can remain undetectable to the human ear.

The MAA fulfills an important role in sound localization in the azimuth plane containing both the sound source and the ears of the listener. Where ⊖ represents the angle of the sound source in the azimuth plane, offset from the center of the listener's ears, r is the distance from the sound source to the center of the head of the listener, and d is the interaural distance, the distance of the sound source from the right and left ear and their difference can be computed according to the following mathematical expressions:

$$\Delta r^2=(r*\cos\Theta)^2+(r*\sin\Theta-d/2)^2$$

$$\Delta l^2=(r*\cos\Theta)^2+(r*\sin\Theta+d/2)^2$$

$$\Delta d=\Delta r-\Delta l.$$

Based upon the foregoing formulae, the geometric relationship of the MAA to IPD can be expressed as:

$$\phi=\Delta d*(f/c)*2\Pi$$

where ϕ is the resulting IPD, f is the frequency of oscillation of the sound source, and c is the speed of sound in air, and Π equals 3.14159. The resulting IPD, as it will be recognized by the skilled artisan, represents the phase differences based upon source movements in an audible signal which will be audibly detectable to the human ear. More particularly, it can be said that a pair of identifical sources will be judged as fused to a single source if their separation in terms of phase is smaller than the corresponding MAA, or if the resulting IPD is below the computed maximum limits.

Figure 2:
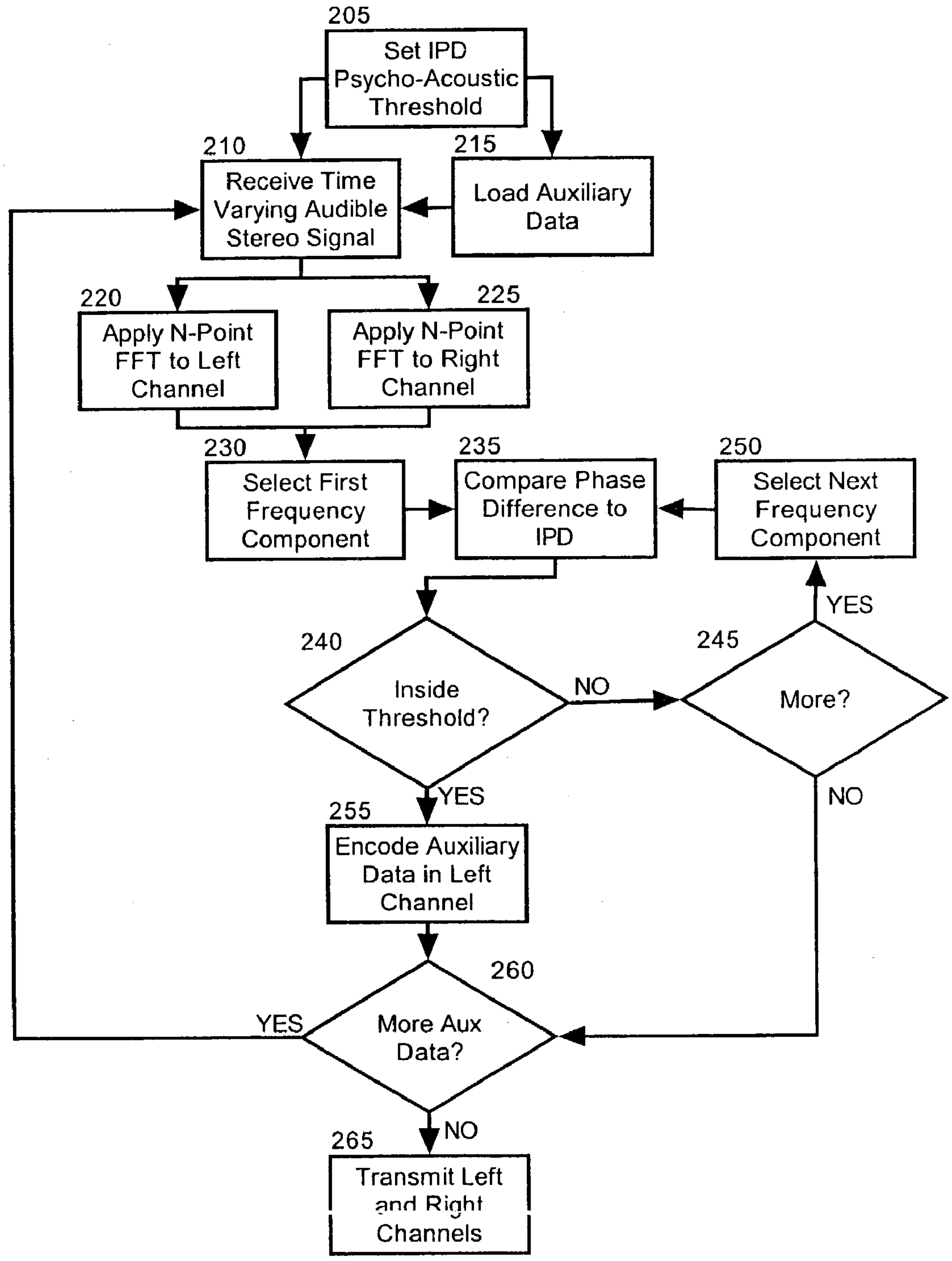
FIG. 2 is a flow chart illustrating a process for masking coded data in a radio signal.

Applying the foregoing IPD analysis to the steganographic technique of hiding auxiliary data within an audible signal, FIG. 2 is a flow chart illustrating a process for masking coded auxiliary data within an audible radio signal. Beginning in block 205, the IPD psycho-acoustic threshold can be established for the particular primary audible signal targeted to carry the auxiliary data, for instance where the MAA is set at 1. In block 210, the time varying audible signal can be received. Additionally, in block 215, the auxiliary data to be masked within the audible signal also can be received.

In blocks 220 and 225, the time varying audible signal can be converted to the frequency spectrum to permit an analysis of the sinusoidal frequency components of the time varying audible signal. Specifically, an N-point rectangular window can be applied to each of the left and right channels through the application of respective N-point fast Fourier transformations. Typically, a 1024-point window can be defined when considering compact disk quality audio at 44.1 kHz.

In block 230, a first frequency component of each channel of the time varying audible signal can be selected for analysis. In block 235, the phase difference of the frequency components can be compared against the computed IPD psycho-acoustic threshold, in modulo-2Π arithmetic. In decision block 240, where the frequency components lie outside the computed IPD psycho-acoustic threshold, those components can remain unmodified as any modification to those components may be audibly detectable to the human ear. Consequently, in decision block 245 if additional frequency components remain to be analyzed, in block 250 the next set of frequency components can be selected for analysis and the process can repeat through block 235. Otherwise, the process can proceed through decision block 260.

If, however, in decision block 240 the frequency components lie within the computed IPD-psycho-acoustic threshold, those components can form the encoding space in which the auxiliary data can be fused. Specifically, in block 255 a portion of the auxiliary data can be encoded within the selected frequency components by varying the phase difference between the left and right channels of the selected frequency components. Subsequently, in decision block 260, if additional auxiliary data remains to be encoded in the audible signal. If so, the process can repeat through block 210. Otherwise the process can terminate in block 265.

Figure 3:
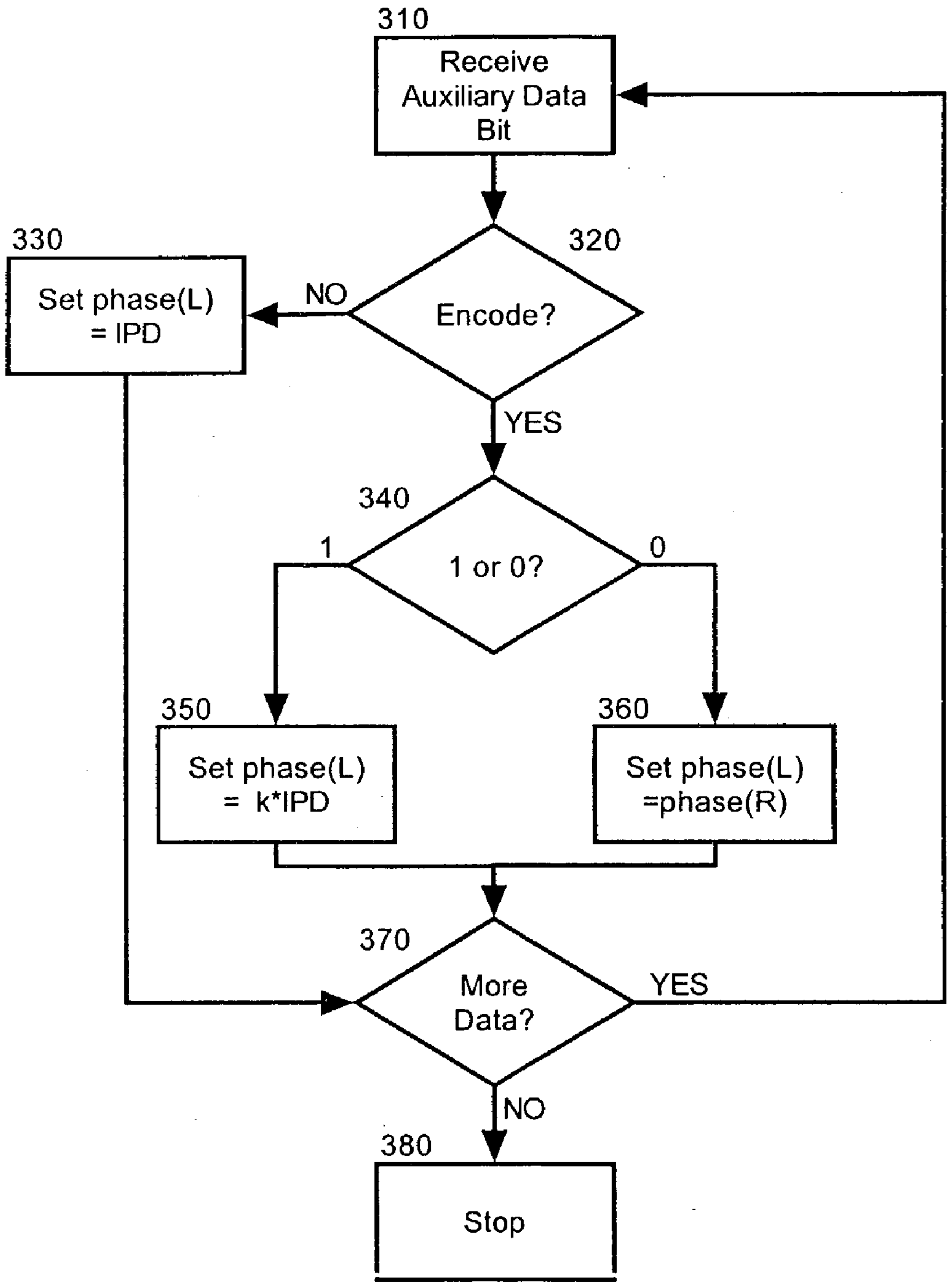
FIG. 3 is a flow chart illustrating a process for encoding auxiliary data for inclusion in the radio signal of FIG. 2.

Notably, in block 255, the portion of the auxiliary data can be encoded in the audible signal by modifying the signal characteristics of the audible signal. To that end, FIG. 3 is a flow chart illustrating a process for encoding auxiliary data for inclusion in the radio signal of FIG. 2. Beginning in block 310, a first auxiliary data bit can be received. If in decision block 320 it is determined not to encode the auxiliary data bit in the audible signal, in block 330 the phase of the left channel of the audible signal can be set to the maximum IPD psycho-acoustic threshold. Otherwise, in decision block 340 it can be determined whether the auxiliary data bit is a logical one or a logical zero.

In block 360, where the auxiliary data bit is a logical zero, the phase of the frequency portion of the left audio channel can be set to the phase of the frequency portion of the right channel. By comparison, in block 350, where the auxiliary data bit is a logical one, the phase of the frequency component of the left channel can be set to a fractional proportion, k, of the IPD psycho-acoustic threshold. The fractional proportion k can specify the amount of phase difference within the IPD psycho-acoustic threshold which denotes a logical one and, in an exemplary embodiment, can be set to ½. In either case, in decision block 370, if more data bits are to be encoded in the frequency portion of the audible signal, the process can repeat. Otherwise, the encoding process can terminate in block 380.

Figure 4:
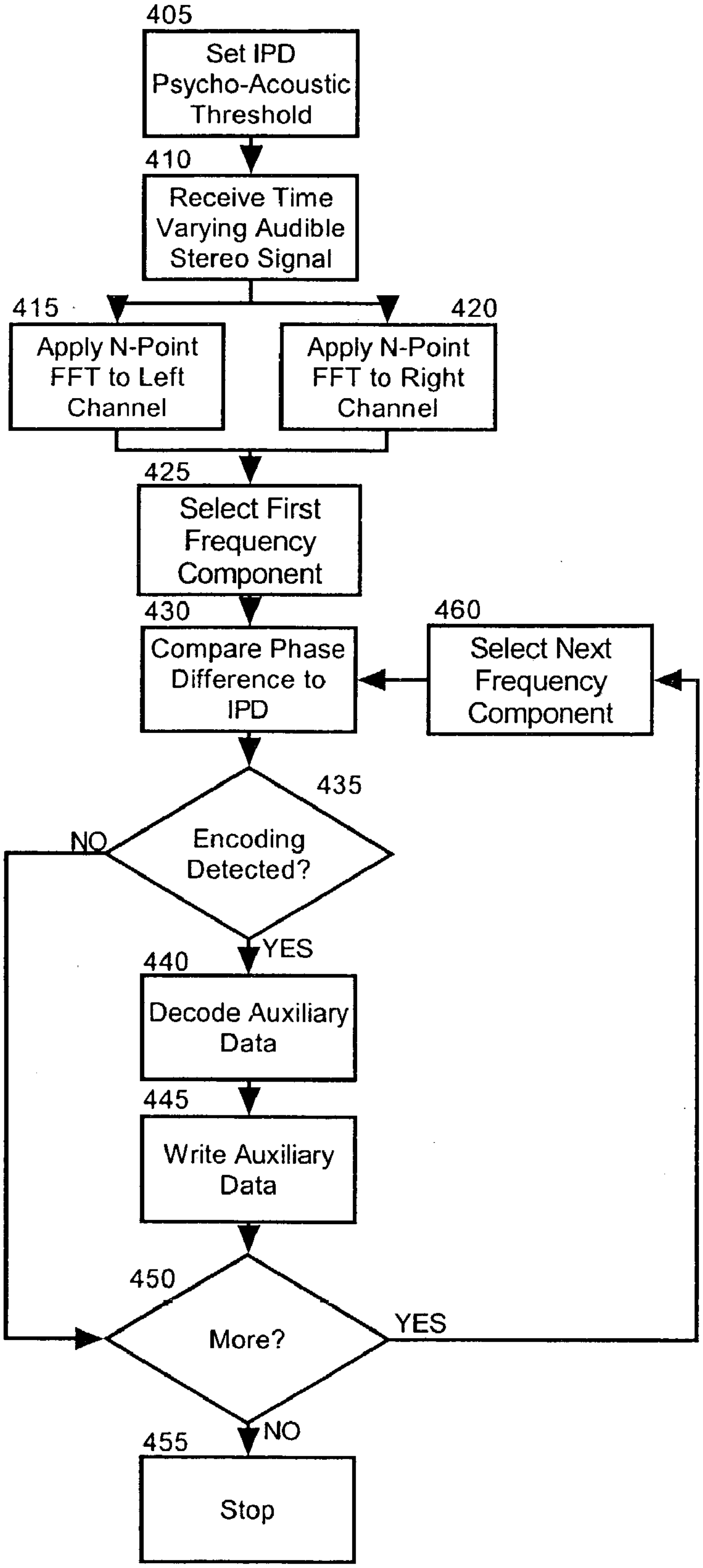
FIG. 4 is a flow chart illustrating a process for unmasking coded data from the radio signal of FIG. 2.

FIG. 4 is a flow chart illustrating a process for unmasking coded data from the radio signal of FIG. 2. Beginning in block 405, the IPD psycho-acoustic threshold can be established and in block 410, the time varying audible signal containing the encoded auxiliary data can be received. In blocks 415 and 420, a portion of the time varying signal can be transformed into the frequency domain to produce a set of summed, sinusoidal frequency components forming the time varying audible signal.

In block 425, a first frequency component of each channel of the time varying audible signal can be selected for analysis. In block 430, the phase difference of the frequency components can be compared against the computed IPD psycho-acoustic threshold, in modulo-2$\pi$ arithmetic. In decision block 435, where the phase difference of the frequency components lie outside the maximum range of the computed IPD psycho-acoustic threshold, it can be presumed that no auxiliary data has been encoded about the frequency component under analysis. Accordingly, in decision block 450, if more frequency components remain to be analyzed, in block 460 the next set of frequency components can be selected and the process can repeat through block 430.

If, however, in decision block 435, the phase difference of the frequency components are determined to lie within the range specified by the IPD psycho-acoustic threshold, it can be presumed that auxiliary data has been encoded in the set of frequency components. To that end, in block 440, the auxiliary data can be decoded so as to produce the auxiliary data. Subsequently, in block 445 the auxiliary data can be written to memory. In decision block 450, if more frequency components remain to be analyzed, the process can repeat through block 460 with the next set of frequency components. Otherwise, in block 455 the process can terminate.

Figure 5:
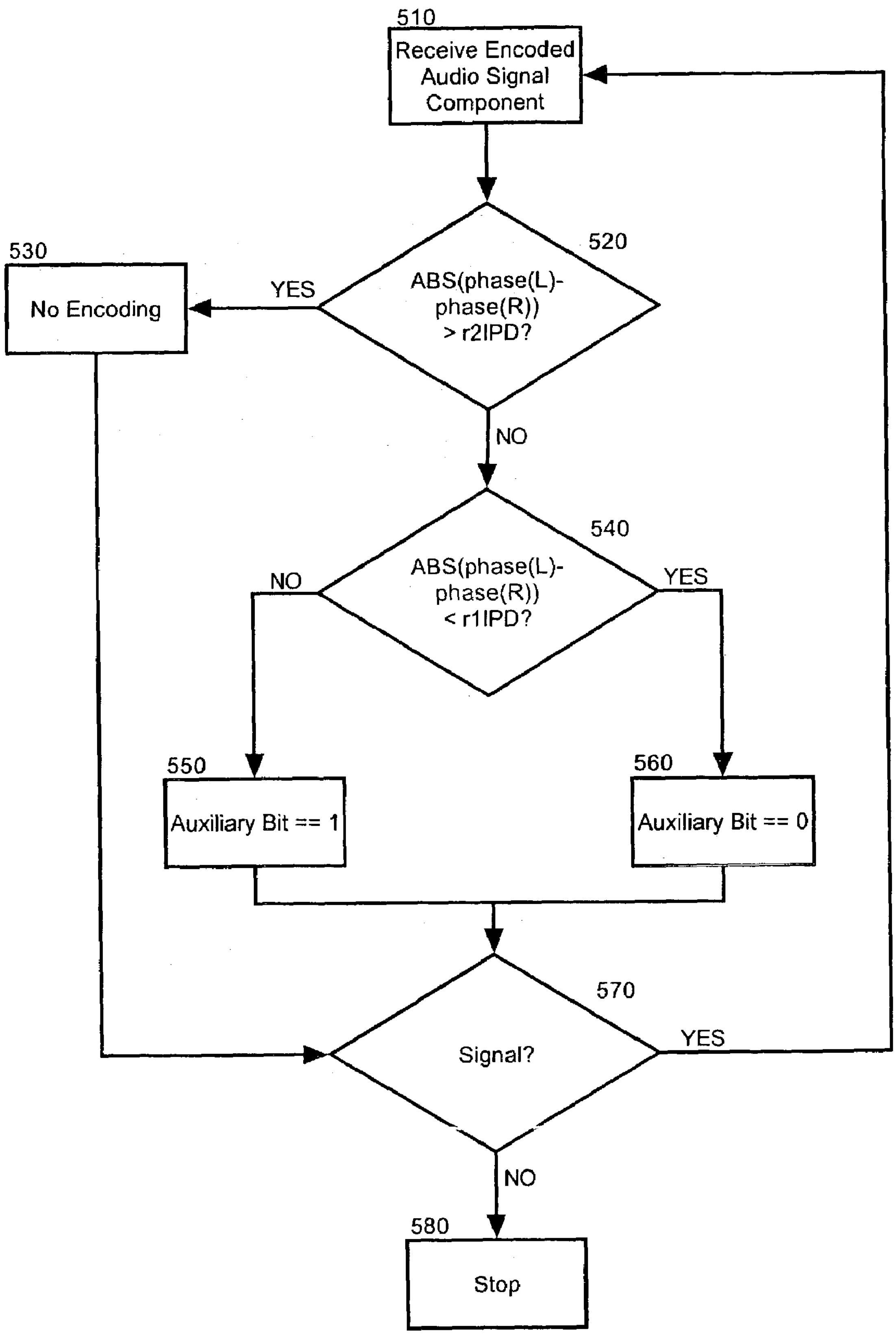
FIG. 5 is a flow chart illustrating a process for decoding auxiliary data from the radio signal of FIG. 4.

As in the case of the encoding process of FIG. 3, FIG. 5 is a flow chart illustrating a process for decoding auxiliary data from the radio signal of FIG. 4. Beginning in block 510, the encoded frequency portion of the audio signal can be received for processing. In decision block 520, if the absolute value of the difference between the phase of the left and right channels of the audio signal differs by a margin which exceeds a maximum constant proportion of the IPD psycho-acoustic threshold, in block 530 it can be presumed that no encoded auxiliary data resides in the frequency component of the audio signal under study. Notably, though the invention is not limited in this regard, a typical maximum constant proportion can include ¾.

Otherwise, it can be presumed that encoded auxiliary data resides in the frequency component of the audio signal under study. As a result, in decision block 540 it can be determined whether the absolute value of the difference between the phase of the left and right channels of the audio signal differs by a margin which falls below a minimum constant proportion of the IPD psycho-acoustic threshold. Again, though the invention is not limited in this regard, a typical minimum constant proportion can include ¼. If so, in block 550 the auxiliary data can be decoded as a zero. Otherwise, in block 560 the auxiliary data can be decoded as a one. Finally, in decision block 570 if more frequency components remain to be analyzed, the process can repeat through block 510. Otherwise the process can terminate in block 580.

Figure 6:
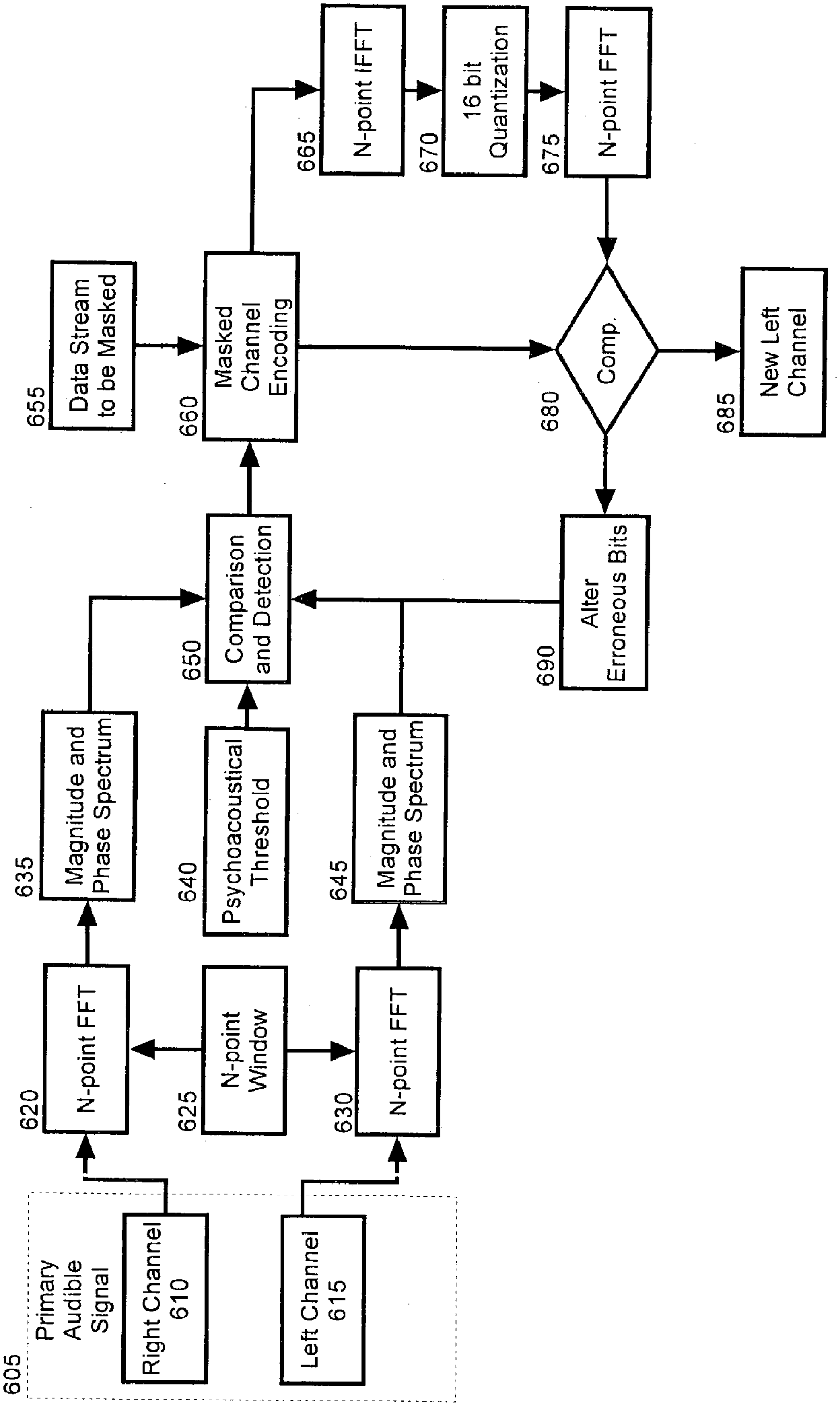
FIG. 6 is a block diagram of a system for masking coded data in a radio signal; and, FIG. 7 is a block diagram of a system for unmasking coded data from the radio signal of FIG. 6.

The method of the invention can be implemented either in hardware, firmware or software as a system for coding a masked data channel in an audible signal. In this regard, FIG. 6 is a block diagram of a system for masking coded data in a radio signal. As shown in FIG. 6, an audio signal 605 having two or more audio channels 610, 615 can be processed to carry an auxiliary data stream 655 without consuming additional frequency bandwidth to accommodate the auxiliary data stream 655. An N-point rectangular window 624, for instance a 1,024 point rectangular window can be defined and applied via fast Fourier transformation processors 620, 630 to the audio channels 610, 615. Consequently, each of the fast Fourier transformation processors 620, 630 can produce respective magnitude and phase spectrums 635, 645.

An IPD psycho-acoustic threshold 640 can be applied to a comparator and detection processor 650 to identify those phase components of the audio channels 610, 615 having a phase differential below a proportional constant of the IPD psycho-acoustic threshold 640. Phase components outside of the threshold may be left untouched and passed on for synthesis. The remaining phase components, by comparison, may remain part of the encoding space. The auxiliary data 655 to be masked in the audio signal 605 can be received via independent channel. For the case of a single bit per frequency component, whenever a logical zero is to be encoded, the masked channel encoder 660 can equalize the phase values of the left channel 615 and right channel 610. By comparison, for the case of a logical one, the phase difference can be made less or equal to the maximum permissible IPD for that frequency component.

Notably, in a preferred aspect of the invention, the effects of quantization noise upon the masking process can be tested iteratively through the application of an inverse fast Fourier transformation 665, followed by a sixteen bit quantization 670 and yet again followed by a fast Fourier transformation 670. The frequency spectrum of the reproduced signal can be compared 680 to the frequency spectrum of the original signal. If the quantization has disturbed the representation of the masked data, then the erroneous frequency components can be detected and rendered unusable by an alteration process 690 in which the phase difference can be enhanced by 120% of the IPD of that frequency location. Subsequently, the new phase profile of the channel can be resubmitted to the iterative testing process.

This iterative testing process can continue until no errors are detected in the masking process 660. If the inserted auxiliary data 665 in a given N-point audio signal frame has not been altered by the quantization process, and therefore no errors where detected, then the encoding process can be presumed successful. Accordingly, the new N points of the left channel 615 can be presented for storage or transmission. This encoding process can continue with subsequent N-point frames of the original audio signal until no auxiliary data 665 remains to be encoded about the audio signal 605.

Figure 7:
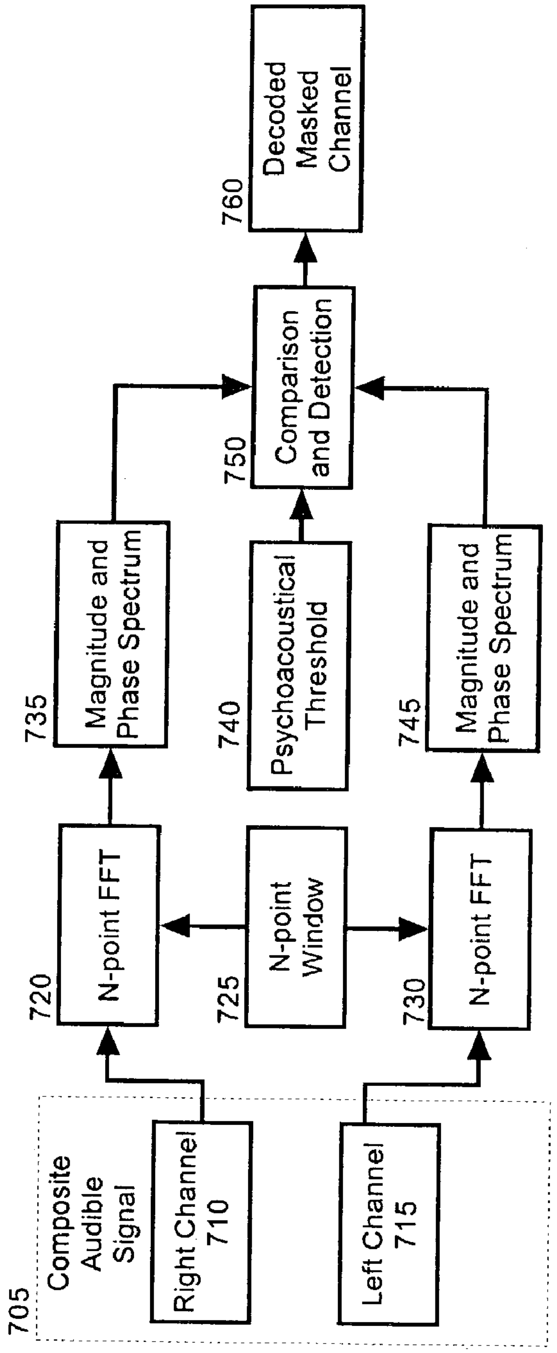

An inverse system can be configured to extract encoded masked auxiliary data from the audio signal of FIG. 6. More particularly, FIG. 7 is a block diagram of a system for unmasking coded data from the radio signal of FIG. 6. As shown in FIG. 7, a composite signal 705 can include at least two channels 710, 715 of time varying audio data upon which the auxiliary data can be encoded. An N-point rectangular window 725, for instance a 1,024 point rectangular window can be defined and applied via fast Fourier transformation processors 720, 730 to the audio channels 710, 715. Consequently, each of the fast Fourier transformation processors 720, 730 can produce respective magnitude and phase spectrums 735, 745.

An IPD psycho-acoustic threshold 740 can be applied to a comparator and detection processor 650 to identify and detect those phase components of the audio channels 710, 715 having a phase differential. Where the phase difference exceeds a proportional constant of the maximum IPD psycho-acoustic value, it can be presumed that no auxiliary data has been encoded thereon. By comparison, where the phase difference falls below a proportional constant of the minimum IPD psycho-acoustic value, it can be presumed not only that auxiliary data has been encoded thereon, but also that the auxiliary data is a logical one. Otherwise it can be presumed that the auxiliary data is a logical zero. In further illustration, the following table can be helpful in explaining the logic of the decoding process of the comparator and detector 750 when decoding the masked channel 760:

$$|\text{phase}[X_L(f)] - \text{phase}[X_R(f)]| = \; < r_1 \mid PD_{\max}(f) \rightarrow \text{Logical } 0$$

$$r_1 \mid PD_{\max}(f) < |\text{phase}[X_L(f)] - \text{phase}[X_R(f)]| = \; < r_2 \mid PD_{\max}(f) \rightarrow \text{Logical } 1$$

$$|\text{phase}[X_L(f)] - \text{phase}[X_R(f)]| > r_2 \mid PD_{\max}(f) \rightarrow \text{No Encoding}$$

where $r_1$ and $r_2$ specify ranges of phase differences used in the decoding process to extract logical 0, logical 1, or to indicate that no encoding has been included in the particular frequency component under examination. As an example, $r_1$ can be ¼ and $r_2$ can be ¾.

Importantly, in both the encoder of FIG. 6 and decoder of FIG. 7, the size of the phase quantization step can determine the amount of auxiliary data able to be encoded in the audio signal. Additionally, the computation process selected within the implementation can have a further impact upon the amount of auxiliary data able to be encoded in the audio signal. In that regard, the selection of a fixed or floating-point arithmetic strategy for undertaking the fast Fourier and inverse fast Fourier transformations can have a direct impact on the resulting error. In any case, it has been experimentally determined that the system of FIGS. 6 and 7 can realize high bandwidth data payload capacity when compared to prior art methodologies. See e.g. Iliev, A., Scordilis, M., *Binaural Phase Masking Experiments in Stereo Audio*. PROCEEDINGS OF THE ACOUSTICAL SOCIETY OF AMERICAMEETING (Cancun, 2002).

The method of the present invention can be realized in hardware, software, or a combination of hardware and software. An implementation of the method of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for coding auxiliary data in an inaudible channel in an audio signal, the method comprising the steps of:

establishing an upper bound imperceptible interaural phase difference (IPD) between at least two audible channels in the audio signal below which differences in phase between said channels cannot be audibly detected;

identifying frequency component portions of the audio signal corresponding to said channels having a phase difference which does not exceed said established upper bound IPD; and, modifying phase differences between said identified frequency component portions to encode digital auxiliary data in the audio signal, whereby the encoded digital auxiliary data can be decoded by detecting said modified phase differences between said identified frequency component portions of the audio signal.

2. The method of claim 1, wherein said modifying step comprises the steps of:

determining whether a bit subject to encoding of said auxiliary data comprises a logical one or a logical zero value;

if it is determined that said bit comprises a logical zero value, setting a phase value for a left channel portion of said identified frequency component portions equivalent to a phase value for a right channel portion of said identified frequency component portions in order to express a logical zero; and, if it is determined that said bit comprises a logical one value, setting a phase value for a left channel portion of said identified frequency component portions equivalent to said established upper bound IPD.

3. The method of claim 1, wherein said modifying step comprises the steps of:

determining whether a bit subject to encoding of said auxiliary data comprises a logical one or a logical zero value;

if it is determined that said bit comprises a logical zero value, setting a phase value for a left channel portion of said identified frequency component portions equivalent to a phase value for a right channel portion of said identified frequency component portions in order to express a logical zero; and, if it is determined that said bit comprises a logical one value, setting a phase value for a left channel portion of said identified frequency component portions equivalent to a fractional constant portion of said established upper bound IPD.

4. The method of claim 1, further comprising the step of decoding said encoded digital auxiliary data by detecting said modified phase differences between said identified frequency component portions of the audio signal.

5. The method of claim 4, wherein said decoding step comprises the steps of:

establishing a range of phase values below said established upper bound IPD, said range having lower and upper bound phase values;

identifying frequency component portions of a received audio signal corresponding to left and right audio channels, said left and right audio channels having a phase difference which does not exceed said established upper bound phase value;

computing a difference in phase value for said left and right audio channels; and, decoding said encoded digital auxiliary data to a logical zero if an absolute value of said computed difference does not exceed said established lower bound phase value, and decoding said encoded digital auxiliary data to a logical one if said absolute value of said computed difference falls within said established range.

6. The method of claim 1, further comprising the steps of:

identifying noise in said frequency components of the audio signal once the audio signal has been encoded with said digital auxiliary data; and, for selected ones of said frequency components which are determined to contain enough noise so as to have corrupted said encoded digital auxiliary data, enlarging a phase value for said selected ones of said frequency components so that a phase difference between channels in said selected ones of said frequency components exceed said established upper bound IPD.

7. The method of claim 6, further comprising the step of iteratively repeating said identifying and enlarging steps until no errors are detected in said frequency components.

8. The method of claim 1, wherein said step of identifying frequency component portions of the audio signal corresponding to said channels having a phase difference which does not exceed said established upper bound IPD comprises the steps of:

performing an N-point fast Fourier transform (FFT) on each channel of the audio signal, said performing step producing a magnitude and phase spectrum for each of said channels; and, comparing phase values of each frequency component in said phase spectrum for each of said channels to identify frequency component portions of the audio signal having a phase difference which does not exceed said established upper bound IPD.

9. The method of claim 5, wherein said step of identifying frequency component portions of a received audio signal corresponding to left and right audio channels, said left and right audio channels having a phase difference which does not exceed said established upper bound phase value, comprises the steps of:

performing an N-point fast Fourier transform (FFT) on each of said left and right audio channels, said performing step producing a magnitude and phase spectrum for each of said left and right audio channels; and, comparing phase values of each frequency component in said phase spectrum for each of said channels to identify frequency component portions of the audio signal having a phase difference which does not exceed said established upper bound IPD.

10. A system for supplementing an audio signal with auxiliary data in an inaudible channel, the system comprising:

an audible radio signal source comprising at least a left channel and a right channel;

a digital signal processor programmed to transform said audible radio signal source into a frequency domain representation comprising a plurality of frequency component portions of said audible radio signal;

a comparator coupled to said digital signal processor and having an established imperceptible interaural phase differential (IPD), said comparator identifying selected ones of said frequency component portions having corresponding phase values which do not exceed said imperceptible IPD; and, an encoder configured to encode a digital auxiliary data signal into said audible radio signal by modifying said corresponding phase values to correspond to individual bit values of said digital auxiliary data.

11. The system of claim 10, further comprising a decoder coupled to a digital signal processor having said established imperceptible IPD and configured to decode said digital auxiliary data in said audible radio signal by detecting said modified corresponding phase values and translating said modified corresponding phase values into bit values for said digital auxiliary data.

12. The system of claim 10, wherein said digital auxiliary data comprises positional data produced by a global positioning system.

13. The method of claim 10, wherein said digital auxiliary data comprises audio watermarking data produced to control use and distribution of the audible radio signal.

14. The method of claim 10, wherein said digital auxiliary data comprises audio watermarking data produced to supplement the audible radio signal.

15. The method of claim 10, wherein the audible radio signal comprises digital video.

16. A machine readable storage having stored thereon a computer program for coding auxiliary data in an inaudible channel in an audio signal, the computer program comprising a routine set of instructions for causing the machine to perform the steps of:

establishing an upper bound imperceptible interaural phase difference (IPD) between at least two audible channels in the audio signal below which differences in phase between said channels cannot be audibly detected;

identifying frequency component portions of the audio signal corresponding to said channels having a phase difference which does not exceed said established upper bound IPD; and, modifying phase differences between said identified frequency component portions to encode digital auxiliary data in the audio signal, whereby the encoded digital auxiliary data can be decoded by detecting said modified phase differences between said identified frequency component portions of the audio signal.

17. The machine readable storage of claim 16, wherein said modifying step comprises the steps of:

determining whether a bit subject to encoding of said auxiliary data comprises a logical one or a logical zero value;

if it is determined that said bit comprises a logical zero value, setting a phase value for a left channel portion of said identified frequency component portions equivalent to a phase value for a right channel portion of said identified frequency component portions in order to express a logical zero; and, if it is determined that said bit comprises a logical one value, setting a phase value for a left channel portion of said identified frequency component portions equivalent to said established upper bound IPD.

18. The machine readable storage of claim 16, wherein said modifying step comprises the steps of:

determining whether a bit subject to encoding of said auxiliary data comprises a logical one or a logical zero value;

if it is determined that said bit comprises a logical zero value, setting a phase value for a left channel portion of said identified frequency component portions equivalent to a phase value for a right channel portion of said identified frequency component portions in order to express a logical zero; and, if it is determined that said bit comprises a logical one value, setting a phase value for a left channel portion of said identified frequency component portions equivalent to a fractional constant portion of said established upper bound IPD.

19. The machine readable storage of claim 16, further comprising the steps of:

identifying noise in said frequency components of the audio signal once the audio signal has been encoded with said digital auxiliary data;

for selected ones of said frequency components which are determined to contain enough noise so as to have corrupted said encoded digital auxiliary data, enlarging a phase value for said selected ones of said frequency components so that a phase difference between channels in said selected ones of said frequency components exceed said established upper bound IPD; and, iteratively repeating said identifying and enlarging steps until no errors are detected in said frequency components.

20. The machine readable storage of claim 16, wherein said step of identifying frequency component portions of the audio signal corresponding to said channels having a phase difference which does not exceed said established upper bound IPD comprises the steps of:

performing an N-point fast Fourier transform (FFT) on each channel of the audio signal, said performing step producing a magnitude and phase spectrum for each of said channels; and, comparing phase values of each frequency component in said phase spectrum for each of said channels to identify frequency component portions of the audio signal having a phase difference which does not exceed said established upper bound IPD.

* * * * *